Dec. 22, 1959
A. J. FRUENDT
2,918,335
HIGH-LOAD CAPACITY, TAPER BEARING SWIVEL
Filed April 30, 1957
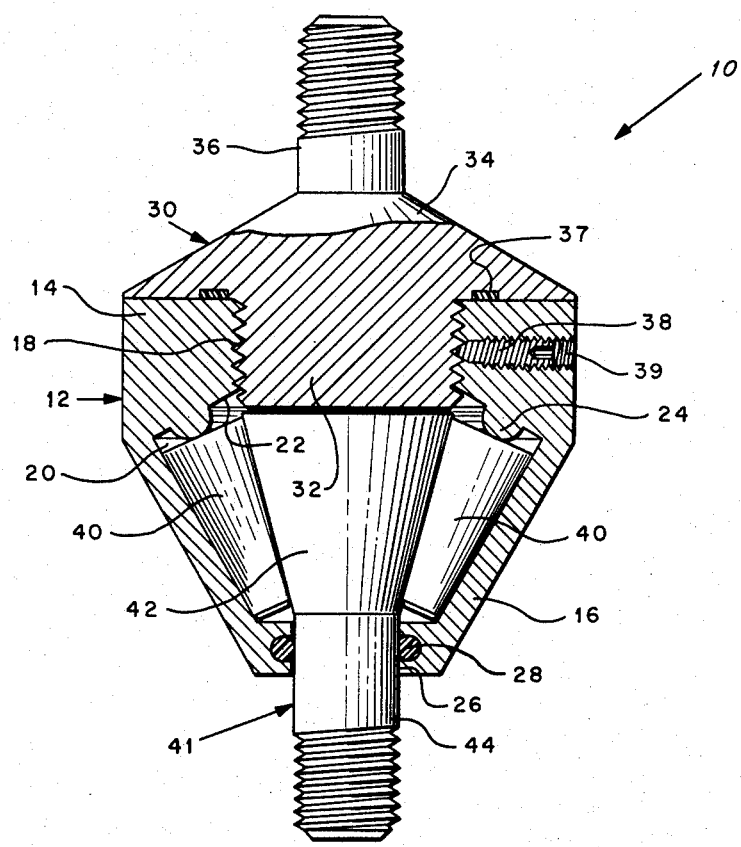
*INVENTOR.*
ADEL J. FRUENDT
BY
*ATTORNEYS*

United States Patent Office 2,918,335
Patented Dec. 22, 1959

2,918,335

HIGH-LOAD CAPACITY, TAPER BEARING SWIVEL

Adel J. Fruendt, Hatboro, Pa.

Application April 30, 1957, Serial No. 656,155

2 Claims. (Cl. 308—227)

(Granted under Title 35, U.S. Code (1952), sec. 266)

The invention described herein may be manufactured and used by or for the Government of the United States of America for governmental purposes without the payment of any royalties thereon or therefor.

The present invention relates to a high capacity, taper bearing swivel and more particularly to a high-load swivel utilizing a plurality of tapered needle bearings.

Existing swivel devices of this type are either of too small capacity when made small or too large and clumsy when designed for the high loads contemplated for use of this invention. The present invention combines the features of compactness and high capacity by resorting to a compact arrangement of tapered needle bearings within a specially constructed casing. The design is made very compact by providing that the outer race of these tapered bearings shall also be the swivel casing, the inner race of the tapered bearings a tension member for the whole device. This design as will hereinafter be disclosed makes a very compact construction capable of carrying extremely large loads.

An object of the present invention is the provision of a high capacity swivel which is relatively small in size and capable of rotation without binding or loosening.

Another object is to provide a high capacity swivel utilizing a novel arrangement of parts including tapered needle bearings for making a compact unit of relatively simple construction.

A further object of the invention is the provision of a high capacity swivel which is capable of efficiently carrying loads far in excess of loadings permissible on other swivels of similar size.

The exact nature of this invention as well as other advantages thereof will be readily apparent from consideration of the following specification relating to the annexed drawing in which there is shown an elevational cross section view of a preferred form of the invention.

Swivel 10 consists of a metal casing 12 which is divided into a cylindrical section 14 and a tapered section 16. Casing 12 is hollow, being provided with a threaded female section 18 within cylindrical section 14 and a cavity 20 within tapered section 16 for a purpose hereinafter described. Separating the two interior sections 18 and 20 there is provided an angular, annular shoulder 22 provided with an annular lip 24 located centrally of shoulder 22. A circular opening 26 in the bottom of casing 12 is provided with an O ring 28 for sealing, as hereinafter explained.

Threaded into the top of casing 12 is a solid cap 30 consisting of a threaded male section 32, a conical section 34 and a narrow, upper cylindrical section 36 which may be threaded as illustrated. An annular gasket 37 between casing 12 and cap 30 insures a tight fit between these two members, while a set screw 38 in the tapped opening 39 of casing 12 should maintain the fit in service. Within cavity 20 are mounted a plurality of tapered needle bearings 40 which line the inside outer wall of cavity 20 as illustrated. A tension member 41 is inserted from the top of casing 12 through opening 18 with cap 30 removed so that the conical shaped section 42 of member 41 contacts all of the tapered needle bearings along their full length holding them in place. The annular lip 24 on shoulder 22 helps to maintain bearings 40 in place and serves as a thrust reaction member by contacting their top end faces along the central axis of each of the bearings. With cap 30 screwed tightly into place, the bottom face of male member 32 should be spaced a short distance from the top face of tension member 41. It should be noted that member 41 has a cylindrical section 44 which also may be threaded. Chamber 20 may be filled with a lubricating fluid while O ring 28 will seal to prevent leakage therefrom.

The device described above is a compact unit utilizing all portions of the structure in a very efficient manner. For example, casing 12 serves as the outer race for tapered bearings 40 while inner tension member 41 serves as the inner race for these bearings thereby providing a very efficient and compact design. Further, the design is such that in operation it is impossible for there to occur either binding or loosening of the bearings without the actual destruction of casing 12.

It is thus seen that there has been provided a novel high-load swivel device which is relatively compact, light, and relatively simple in construction. The device described is capable of use under the most difficult conditions since it is such that it will not bind or loosen even when the maximum loading of the device has been reached.

It should be understood, of course, that the foregoing disclosure relates to only a preferred embodiment of the invention and that numerous modifications or alterations may be made without departing from the spirit and scope of the invention as set forth in the appended claims. For example, other expedients may be resorted to in connecting swivel 10 between a load and a support than the threaded sections 36 and 44 shown, or connecting cap 30 to main body 12.

What is claimed is:

1. A tension load supporting swivel device comprising, in combination, a hollow casing having a threaded opening in one end thereof and a second opening in the other end thereof, a first tension member threaded into said threaded opening of said casing for supporting the device under load, a second tension member having a frusto-conical inner bearing race portion disposed within said casing and having a shaft portion extending through said second opening of said casing, said frusto-conical portion of said second tension member tapering towards said shaft portion, the interior of said casing being formed with a frusto-conical outer bearing race portion, and a plurality of frusto-conical needle bearings arranged within said casing in rolling relationship with said inner bearing race portion of said second tension member and said outer bearing race portion of said casing, said needle bearings being disposed with the narrow ends thereof adjacent said second opening of said casing, and said casing having formed therein an annular thrust reaction portion coaxial with and adjacent to said threaded opening therein adapted to be engaged by the upper ends of said needle bearings at a point substantially coincidental with the rotative axis of the latter.

2. A load supporting swivel device comprising, in combination, a hollow casing having a threaded opening formed in the upper end and a second opening formed in the lower end thereof, a first tension member threaded into said threaded opening for supporting the device under load, a second tension member having a frusto-conical portion disposed in said casing and having an elongated portion extending through said second opening of said casing, a plurality of cylindrical needle bearings annularly arranged within said casing, the outer periphery of said frusto-conical portion and the inner wall of said casing respectively forming the inner and outer races for said needle bearings, and annular thrust reaction means integrally connected to said inner wall of said casing adjacent to and coaxial with said outer bearing race and abutting a terminal end of each of said needle bearings along an axis of each of the latter.

References Cited in the file of this patent

UNITED STATES PATENTS

| | | |
|---|---|---|
| 254,970 | Hemmich | Mar. 14, 1882 |
| 573,210 | Dashiell | Dec. 15, 1896 |
| 1,737,793 | Harris | Dec. 3, 1929 |
| 2,318,119 | Westhaver | May 4, 1943 |